United States Patent [19]

Melbye

[11] Patent Number: 4,706,235
[45] Date of Patent: Nov. 10, 1987

[54] DIFFERENTIAL TRACK RECORDING

[75] Inventor: Hartvig E. Melbye, Boulder County, Colo.

[73] Assignee: Storage Technology Partners 11, Louisville, Colo.

[21] Appl. No.: 694,875

[22] Filed: Jan. 25, 1985

[51] Int. Cl.$^4$ .................. G11B 7/013; G11B 21/10
[52] U.S. Cl. .................................... 369/46; 365/51; 369/59; 371/68
[58] Field of Search .............. 369/44, 45, 46, 59, 369/111, 109, 275; 358/342; 371/68; 360/47; 365/51

[56] References Cited

U.S. PATENT DOCUMENTS

| | | | |
|---|---|---|---|
| 2,813,259 | 11/1957 | Burkhart | 360/47 |
| 3,281,804 | 10/1966 | Dirks | 360/47 |
| 3,438,050 | 4/1969 | Aschenbrenner et al. | 369/44 |
| 3,980,811 | 9/1976 | Schaefer et al. | 369/109 |
| 4,310,916 | 1/1982 | Dil | 369/275 |
| 4,325,135 | 4/1982 | Dil et al. | 369/275 |
| 4,338,682 | 7/1982 | Hosaka et al. | 369/44 |
| 4,428,075 | 1/1984 | Hazel et al. | 369/275 |
| 4,539,665 | 9/1985 | Iso et al. | 369/44 |

OTHER PUBLICATIONS

Marks et al., "Distillation Optical Storage", IBM Tech. Disc. Bul., vol. 25, No. 11A, Apr. 1983, pp. 5523-5524.

Primary Examiner—Donald McElheny, Jr.
Attorney, Agent, or Firm—Woodcock Washburn Kurtz Mackiewicz & Norris

[57] ABSTRACT

Apparatus and methods are disclosed for writing data on a track in an optical disk data storage device wherein the track is divided into two parts and binary one bits are written into one part of the data track while binary zero bits are written into the second part of the data track. Detection of data written in this manner is performed using two read coherent radiation beams each positioned over one of the parts of the data track. A binary one is detected if the signal from the beam over the first part of the data track is greater than the signal from the beam over the second part of the data track, and a binary zero is indicated if the signal from the beam over the second part of the data track is greater than the signal of the beam over the first part of the data track. In order to detect the data from the two read beams, they must be aligned accurately over the two halves of the data track. To aid this alignment, a third larger beam is used to measure the total energy from the data track. If the beams are not aligned correctly over the track, the signal output from the large beam will exceed the sum of the signal outputs from the two smaller read beams indicating the offtrack condition and further indicating the direction of the offtrack condition.

5 Claims, 4 Drawing Figures

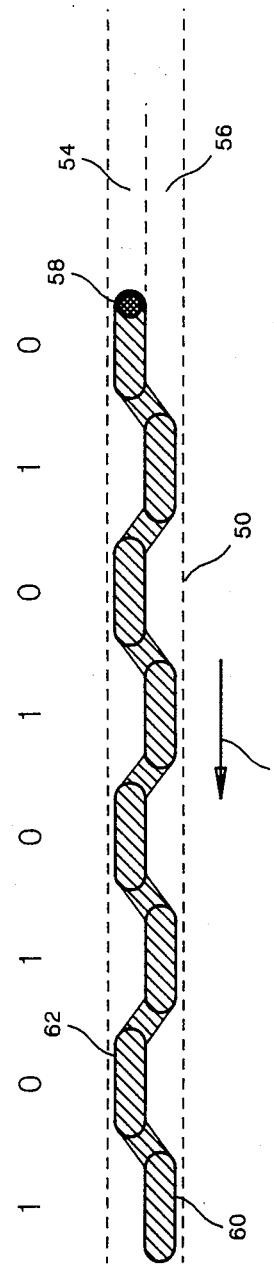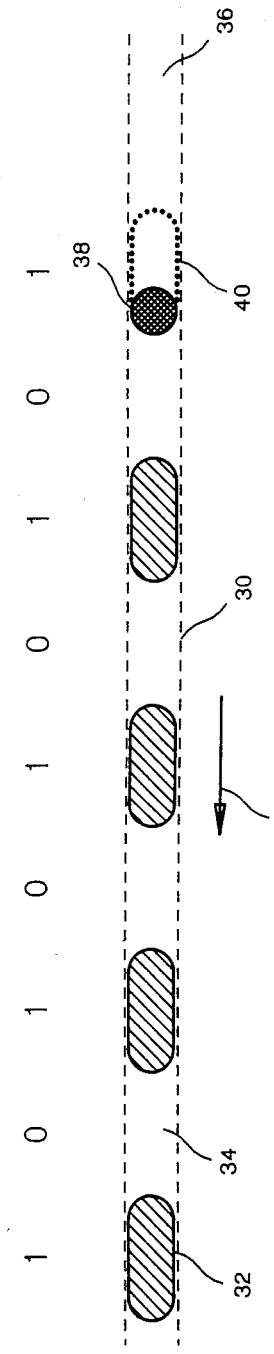

DIFFERENTIAL TRACK RECORDING

BACKGROUND OF THE INVENTION

The present invention relates to optical data storage devices as used in the computer industry and video recording industry, and in particular to an apparatus and method for recording a serial bit train of binary data on a recording medium of such recording devices.

The optical disk used to record information in an optical disk data storage device is in the form of a circular disk plate having a thin layer into which a plurality of reflectivity changes are formed on and along a plurality of circular tracks arranged concentrically or on and along a spiral track. Data in a computer system consists of a series of characters, for example, alphabetic characters, numbers, or special symbols, wherein each character is formed using seven or eight binary bits. To store these characters on the optical disk media, each of the seven or eight bits is written serially along the track, since each track is one bit wide. The process of storing data on a track of the optical storage media consists of arranging reflectivity or transmissivity changes along such track to represent binary ones and binary zeros. In its unrecorded state, a reflective disk medium is either highly reflective or non-reflective. One way to represent binary ones and zeros on such a surface is to allow the unchanged, that is, unrecorded, surface of the disk medium to represent a binary zero, and by means of a coherent radiation beam, such as a helium-neon laser, alter the reflectivity of the surface at a particular spot to represent a binary one. For example, if the unrecorded surface has a high reflectivity, in order to record a binary one bit the coherent radiation beam would be used to create an area of low reflectivity in every location where such a one bit is to be recorded. In its unrecorded state, a transmissive disk recording medium is either clear or opaque. For example, if the unrecorded clear state represents a binary zero, then a coherent radiation beam would be used to alter the medium from clear to opaque to represent a binary one.

In order to retrieve data recorded on the surface, a second coherent radiation beam, having insufficient power to alter the surface of the recording track, is directed toward the medium and a photo detector is used to detect radiation received from the medium. As the beam passes a given area, if radiation is received from the medium, indicating a reflective area on a reflective medium or a clear area on a transmissive medium, then a binary zero is recorded on the medium at that point, whereas if no radiation is received from the medium at such a point, a binary one is recorded thereon. This type of recording could also be reversed, such that a reflective or clear area represents a binary one, and a non-reflective or opaque area represents a binary zero.

One disadvantage to using this type of recording method is that the radiation beam must be turned on and off rapidly to record a series of ones and zeros at a high density. Because of write laser diode device limitations, these rapid on-off changes cause size variations in the reflectivity areas. Another disadvantage to this recording method is that a defect in the recording media will be detected as either a one or a zero and not as a defect. Another disadvantage to this system is that the reflected energy varies whenever a long series of binary ones or a long series of binary zeros is present. This variation in reflected energy complicates the tracking and focusing systems which must align the read beam along the track and focus the beam at the plane of the thin layer.

There is need in the art then for a method of recording data on an optical disk storage medium that does not require the coherent radiation beam that records the data on such medium to turn on and off. There is also a need in the art for a recording system that will simplify the focus and tracking requirements of the coherent radiation beam by providing a constant reflected energy level.

SUMMARY OF THE INVENTION

It is an object of the present invention to provide an apparatus and method of recording information on an optical disk storage medium that does not require the recording radiation beam to pulse on and off.

It is a further object of the present invention to provide a recording system which will allow the reflected energy from a read radiation beam to be substantially constant over the width of the recording track.

The preceding and other objects of the present invention are realized through the use of a differential track recording method wherein bineary ones are recorded as reflectivity or transmissivity changes on a first part of a data track on the recording medium and binary zeros are recorded as changes on a second part of the data track. In this manner the write coherent radiation beam as it is recording data on the track does not need to be pulsed on and off, but instead moves from a first part of the data track to a second part to change from binary ones to binary zeros and moves from the second part back to the first part when changing from binary zero to binary one.

The present invention also includes a method of differentially recording binary data on such a medium wherein a recording means in positioned over a data track and activated in one part of the data track to record a binary one and activated in a second part of such recording track to record a binary zero. This method would therefore record all binary one bits in the first part of the data track and all binary zero bits in the second part of the data track.

The present invention further includes apparatus for detecting differentially recorded binary data on a data track of an optical disk storage medium. The apparatus includes two read radiation beams mounted adjacent to each other and beam alignment means to cause these two radiation beams to impinge on respective first and second parts of the data track. The apparatus also includes two conversion means for converting radiation energy received from the first and second read radiation beams into first and second control signal values, and means for comparing these two control signal values with further means for outputting a binary one signal if the first control signal value is greater than the second control signal value and means for outputting a binary zero signal if the first control signal value is less than the second control signal value. The apparatus further includes a third read beam aligned along the longitudinal axis of the data track at a fixed distance from the first and second beams, and a beam adjustment means for moving all three beams in response to the alignment signal output of a comparing means which compares the energy from the third beam to the sum of the energy from the first and second beams.

The present invention also includes a method of detecting differentially recorded binary data which consists of shining first and second read beams on respective first and second parts of the data track, detecting light received from these two beams and converting it into first and second control signal values, comparing the first and second control signal values to output a binary one signal when the first control signal value is greater than the second control signal value and outputting a binary zero signal when the second control signal value is greater than the first control signal value.

The present invention further includes a disk data storage medium which includes a light sensitive rotating optical disk wherein data recording tracks are defined on a surface of this disk including data recorded in a differential format wherein binary zero data is recorded as optically sensible marks on a first part of the data recording track and binary one data is recorded as optically sensible marks on a second part of the data track.

BRIEF DESCRIPTION OF THE DRAWINGS

FIG. 2A shows a prior art data recording system for recording data on a data track of an optical disk data storage device;

FIG. 2B shows differentially recorded data on a data track of a optical disk data storage device in accordance with the present invention;

DETAILED DESCRIPTION OF THE INVENTION

The following is a description of the best presently contemplated mode of carrying out the present invention. This description is given only to illustrate the general principles of the invention and is not to be taken in a limiting sense. The true scope of the invention can be ascertained by reading the appended claims.

Figure 1:
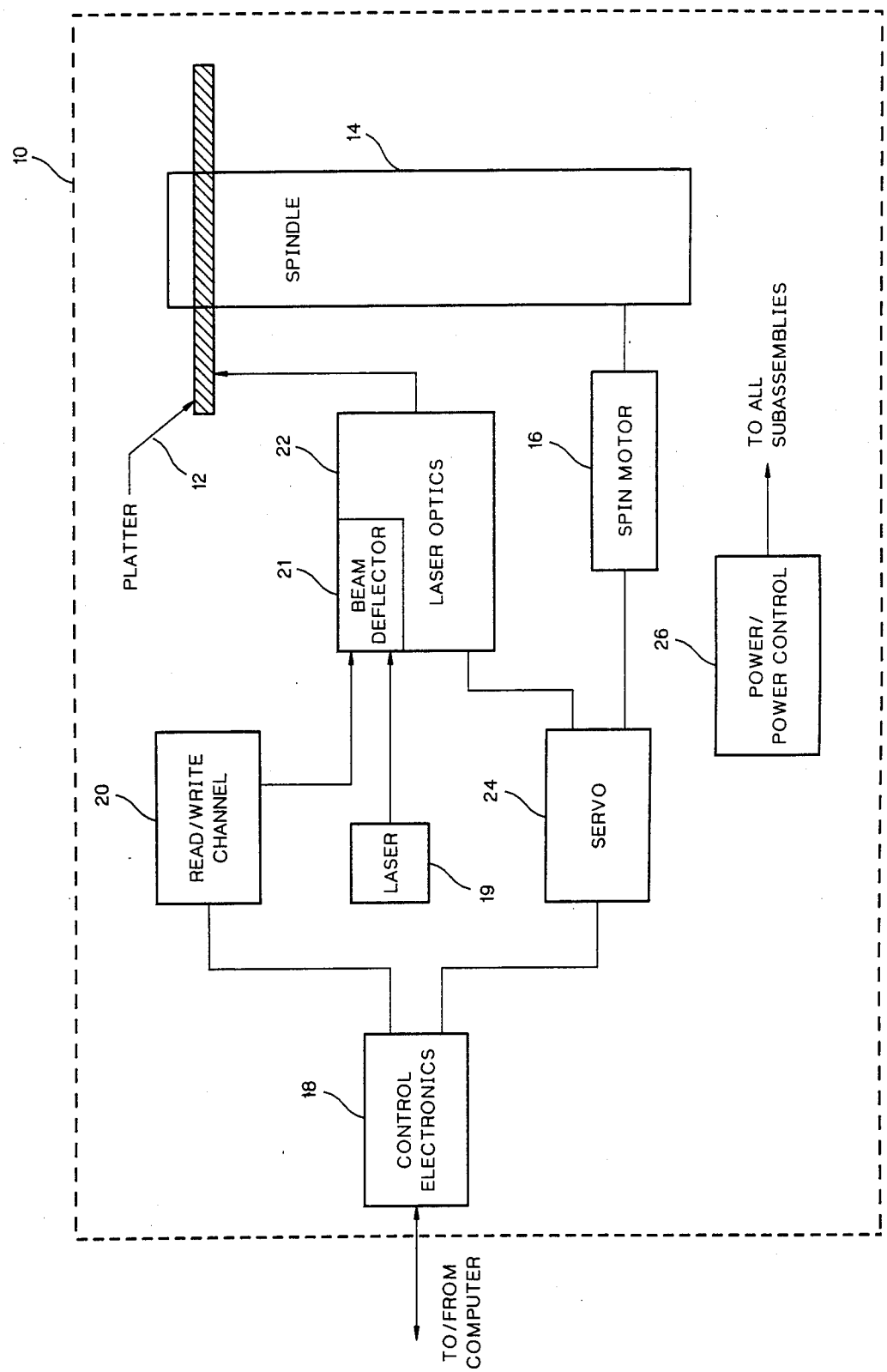
FIG. 1 is a block diagram of an optical disk data storage device showing the major functions of the device.

FIG. 1 is a block diagram of the principle elements of an optical disk data storage system 10 which may be utilized in accordance with the present invention. A platter 12 is mounted and centered on a spindle mechanism 14. A suitable spin motor 16 rotates the spindle 14 and the platter 12 at the desired rotational speed. Signals received from or sent to a computer (not shown) pass through a control electronics section 18. The control electronics section 18, as its name implies, provides the control necessary for communication with the computer, including the interpretation of all commands received from the computer. The control electronics 18 also provides the necessary signals for controlling all of the hardware operations associated with the optical drive system 10.

A read/write channel 20 receives data signals from the central electronics 18 and drives a beam deflector 21 to modulate a beam from a laser 19 by deflecting the beam in one direction for a binary one in another direction for a binary zero. By way of example, a Bragg Angle Modulator could be used as the beam deflector 21. The resulting modulated laser beam is directed through a laser optics section 22 to the surface of the platter 12. Servo control for the spin motor 16 and the moving elements associated with the laser optics 22 is provided by a servo system 24. The servo system 24 actually includes several servo systems, including track seek and follow servo systems, optical focusing servos, spin motor servos, and the like. A power and power control assembly 26 provides the AC/DC power required for the operation of the optical drive system 10. Primary power is secured from a suitable alternating current power source.

FIG. 2A shows the conventional data recording system of prior art optical data storage devices. Information consisting of binary ones and binary zeros is recorded as a series of optically sensible marks in a data track 30. Although not shown, these marks can be of varying length. The unrecorded area 36 shows the media as it exists prior to data being recorded within the data track. The unrecorded reflective media data track can consist of reflective or non-reflective material. A transmissive media data track can consist of clear or opaque material. A binary one pattern 32 is recorded on a data track by changing the underlying optical characteristics of the data track 30, for example, by changing a reflective area to a non-reflective area or by changing a clear area to an opaque area. A binary zero pattern 34 is recorded by not altering the data track 30. A new binary one pattern 40 is written by changing the optical characteristics of the data track 30 as it passes under the write coherent radiation beam 38, moving in the direction of arrow 42, while such radiation beam is turned on.

FIG. 2B illustrates data written differentially in accordance with the present invention. Data is recorded in a data track 50 divided into two parts 54 and 56. A binary one 60 is recorded by an optical change in part 56 of the data track 50, whereas, a binary zero 62 is recorded by an optical change in part 54 of the data track 50. Data is recorded on the data track 50 by a write coherent radiation beam 58 having sufficient power to alter optical characteristics of the data track 50 as the data track 50 passes underneath the write coherent radiation beam 58 moving in the direction of arrow 64. A binary zero is written by shifting the write coherent radiation beam 58 so that it shines on part 54 of the data track 50, and a binary zero is written shifting the write coherent radiation beam 58 so that it shines on part 56 of the data track 50.

Figure 3:
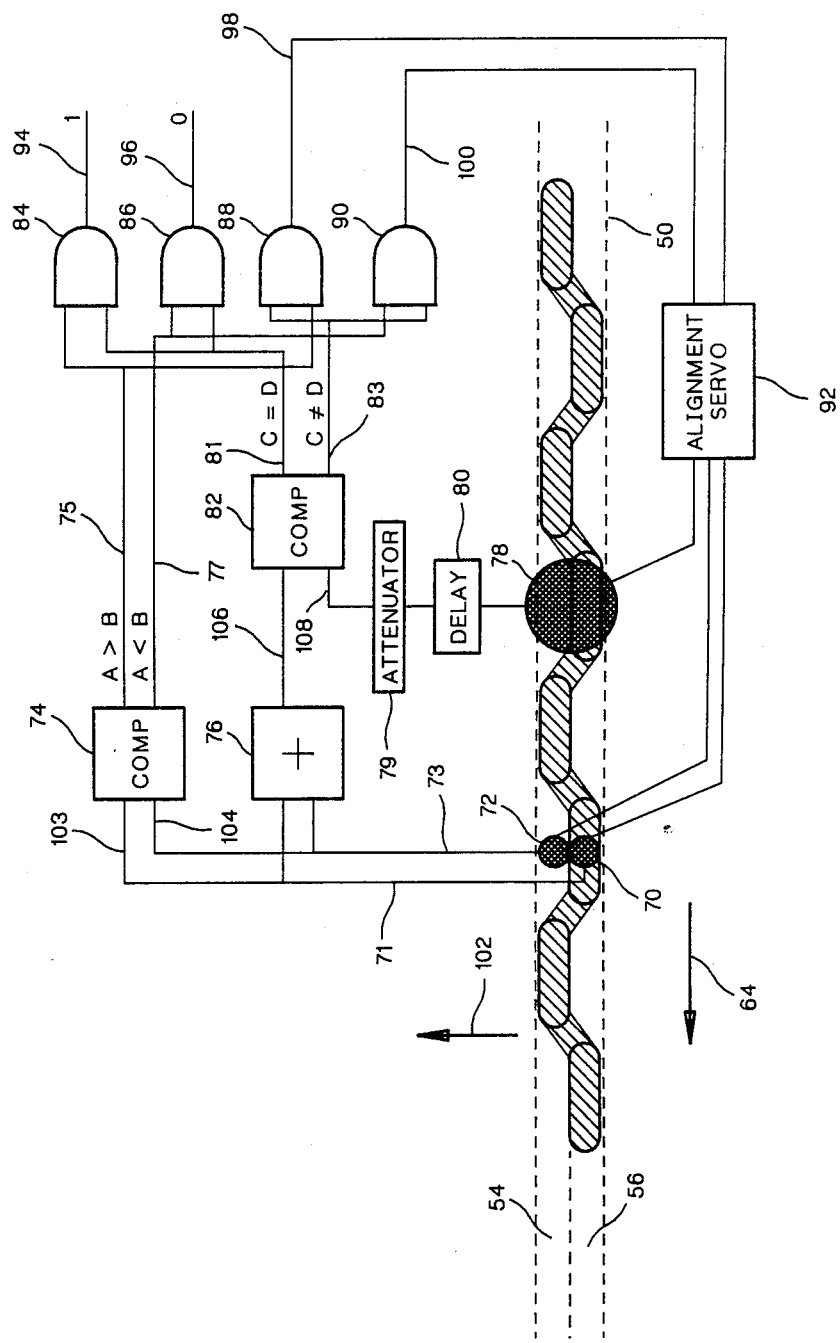
FIG. 3 is a schematic diagram of the present invention showing differentially recorded data and a detection circuit for detecting such data.

FIG. 3 is a schematic diagram of the read circuit of the present invention. A data track 50 contains binary data written in a differential track format, wherein binary ones are written in a first part 56 of the data track 50 and binary zeros are written in a second part 54 of the data track 50. A read coherent radiation beam 70 is aligned over part 56 of the data track 50 to detect the presence of binary one data, and a second read coherent radiation beam 72 is aligned over the second part 54 of the data track 50 to detect binary zero data. Light received from the read radiation beam 70 is converted to an electrical signal 71 and input into a first input 103 of a comparator 74. Light received from the read radiation beam 72 is converted to an electrical signal 73 and input to a second input 104 of the comparator circuit 74. The comparator circuit 74 produces two outputs, the output 75 if the first input 103 is of greater value than the second input 104, and the output 77 if the first input 103 is of a lesser value than the second input 104. The electrical signals from read beams 70 and 72 are summed by the summing circuit 76 and input to the first input 106 of comparator circuit 82.

A third read coherent radiation beam 78 is aligned over track 50 at a fixed distance from the read beam 70 and the read beam 72. The read beam 78 is sufficiently large to span the entire track 50 and to overlap the edges of the track 50 by a small margin. Light received from the read beam 78 is converted into an electrical signal and fed to the delay circuit 80. The delay circuit 80 delays the signal output from the read beam 78 an amount of time sufficient to compensate for the distance between the read beam 78 and the read beams 72 and 70. That is, as the data track 50 rotates in the direction of arrow 64 at a fixed rotation speed, a given point on the data track 50 will pass underneath the read beam 78 a fixed time prior to that same point passing underneath the read beams 70 and 72. The delay circuit 80 delays the signal output of the read beam 78 that same fixed amount of time. The signal output of the delay circuit 80 is fed to the second input 108 of comparator circuit 82 after passing through an attenuator circuit 70 to equalize the signal level. The comparator circuit 82 produces a signal output 81 if the first input 106 and the second input 108 to comparator circuit 82 are equal, and produces a signal output 83 if the first and second inputs to the comparator circuit are not equal. Since the first input 106 to comparator circuit 82 is the sum of the signals 71 and 73, the comparator circuit 82 output 81 will be active if the read beams 72, 70, and 78 are aligned along the center of the track 50. If the read beams 70, 72, and 78 are misaligned, that is, the center line of the three read spots is aligned off the center line of data track 50, the signal output of either the read spot 70 or the read spot 72 will be lower in value since one of these two spots must be off the outside edge of track 50. The read spot 78 however, since it is larger than the entire data track 50, will still have the same signal output even though it is aligned off the center of the track. Therefore, the sum of signals 71 and 73 will be lower than the signal from the read beam 78 and comparator output 83, indicating that the first input 106 and the second input 108 are not equal, will be active.

If the three read beams are aligned along or close to the center of track 50 the signal 81 is active, the outputs of the AND gate circuits 84 and 86 will indicate the detection of data along the track 50. If the read beams 70 and 72 are positioned over a portion of the data track 50 which contains a binary one, the light received from the first part 56 of data track 50 will be higher than the light received from the second part 54 of data track 50 since a binary one is recorded at this particular location. The higher signal output 71 will cause the signal 75 output of comparator circuit 74 to be active and this signal combined with the signal 81 will cause the AND gate 84 to output a signal 94 indicating the presence of a binary one bit. If the read spots 72 and 70 are positioned over a portion of the data track 50 wherein a binary zero is recorded the signal 73 will be greater than the signal 71 causing the output 77 of the comparator circuit 74 to be active and this signal along with signal 81 will cause the AND gate 86 to activate signal 96 indicating the presence of a binary zero.

If the read spots 70, 72, and 78 are not aligned over the center of data track 50, the signal 83 output of comparator circuit 82 will be active. If the misalignment is in the direction of arrow 102, the read beam 72 will be aligned off one side of the data track 50, whereas the read beam 70 will be aligned near the center of the data track 50. In this situation, the signal 71 will be greater than the signal 73 causing the signal 75 to be active from the comparator circuit 74. This signal 75, combined with the signal 83 by the AND gate 88, will cause the signal 98 to be output and fed to the alignment servo 92.

Upon detection of the signal 98, the alignment servo 92, will move all three read beams in a direction opposite that of arrow 102 to bring the three read beams into alignement over the center of data track 50. If the three beams are misaligned in a direction opposite that of arrow 102, the signal 73 will be greater than signal 71 causing the output 77 of the comparator circuit 74 to be active. This output 77, combined with the output 83, by AND gate 90, will cause the signal 100 to be active. This signal 100 is fed to the alignment servo 92 to cause the alignment servo 92 to move the three beams 70, 72, and 78 in the direction of arrow 102 to bring them into alignment over the center of track 50. Those skilled in the electronic art could realize the circuit of FIG. 3 using commercially available components.

While the invention herein disclosed has been described by means of a specific embodiment and application thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. In an optical disk data storage device including a rotating disk storage medium, a method of detecting differentially recorded binary data contained in a data track on said medium, comprising the steps of:
   (a) shining first and second read beams to illuminate respective first and second parts of said data track;
   (b) detecting light received from said first and said second read beams and converting said detected light into respective first and second control signal values;
   (c) comparing said first and second control signal values; and outputting a binary one signal when said first control signal value is greater than said second control signal value; and
   (d) outputting a binary zero signal when said second control signal value is greater than said first control signal value.

2. The method of claim 1 wherein step (b) further comprises the steps of:
   (b)(1) shining a third read beam on said data track;
   (b)(2) detecting light from said third read beam converting said detected light into a third control signal value;
   (b)(3) summing said first and second control signal values to produce a fourth control signal value;
   (b)(4) comparing said third and fourth control signal values; and
   (b)(5) correcting said first, second and third beam positions whenever said third and fourth control signal values are unequal.

3. The method of claim 2 wherein step (b)(5) further comprises the steps of:
   (b)(5)(1) aligning said third read beam a fixed distance from said first and second read beams along a longitudinal axis of said data track to form a beam configuration;
   (b)(5)(2) moving said beam configuration in a direction such that said first beam moves toward the longitudinal axis of said data track when said third control signal value does not equal said fourth control signal value and said first signal value is less than said second signal value; and (b)(5)(3) moving said beam configuration in a direction such that said second beam moves toward the longitudinal axis of said data track when said third control signal value does not equal said fourth control signal value and said first signal value is greater than said second signal value.

4. In an optical disk data storage device including a rotating disk storage medium, apparatus for detecting differentially recorded binary data contained in a data track of said medium wherein binary one bits are recorded on a first part of said data track and binary zero bits are recorded on a second part of said data track, said apparatus comprising:

first and second read beams mounted adjacent to each other;

beam alignment means for aligning said first and second read beams to impinge on respective first and second parts of said data track;

first and second conversion means for converting light from said first and second read beams into respective first and second control signal values;

means for comparing said first and second control signal values;

means for outputting as binary one signal when said first control signal value is greater than said second control signal value; and means for outputting a binary zero signal when said first control signal value is less than said second control signal value.

5. The apparatus of claim 4 wherein said beam alignment means comprises:

a third read beam aligned along the longitudinal axis of said data track at a fixed distance from said first and second read beams, said three beams forming a beam configuration;

beam adjustment means for moving said beam configuration while maintaining the alignment of said beams relative to each other;

third conversion means for converting light from said third read beam into a third control signal value;

summing circuit means for adding said first control signal value to said second control signal value to create a fourth control signal value;

comparing means for comparing said third and fourth control signal values; and controller means for controlling said adjustment means to cause said adjustment means to adjust said beam configuration such that said first beam moves toward the longitudinal center of said data track when said comparing means indicates said third control signal value does not equal said fourth control signal value and said first control signal value is less than said second control signal value, and to cause said adjustment means to adjust said beam configuration such that said second beam moves toward the longitudinal center of said data track when said comparing means indicates said third control signal value does not equal said fourth control signal value and said first control signal value is greater than said second control signal value.

* * * * *